United States Patent Office 3,577,211
Patented May 4, 1971

3,577,211
STABILIZATION OF POLYESTERS
Warren K. Wilson, Cuyahoga Falls, Ohio, assignor to
The Goodyear Tire & Rubber Company, Akron, Ohio
No Drawing. Filed May 22, 1967, Ser. No. 640,403
Int. Cl. D06m *13/12, 13/16*
U.S. Cl. 8—115.5            3 Claims

ABSTRACT OF THE DISCLOSURE

This invention relates to the process in which an organic polymeric structure is treated with a polyacid chloride and then with a reactive ultraviolet light stabilizer to form a structure having a chemically bonded stabilizer.

---

This invention relates to organic polymeric structures, to a process for improving the resistance of such structures to degradation by ultraviolet light, and to the improved products.

Organic polymeric structures deteriorate when exposed to sunlight. In condensation polymers such as the linear polyesters and polyamides, this deterioration is evidenced by darkening and embrittlement of the structure. In other organic polymeric structures the deterioration is evidenced by cracking of the surface accompanied by physical property degradation. There are many chemical compounds that have been used as stabilizers or ultraviolet absorbers to reduce such deterioration. Heretofore, they have been used by incorporating them in the polymer by adding them to molten polymer. In some cases, the stabilizers are used by applying them as a coating on the surface of the polymer structure. The procedure of introducing the chemical into the molten polymer has not proven to be completely satisfactory because ultraviolet light will deteriorate some of the surface of the article before it reaches the chemical compound and is absorbed. The use of the chemicals as a coating would appear to offer much more protection but difficulties are encountered in coating the structure. These difficulties have to do with adherence of the chemical to the structure and the application of it in a homogenous manner to the surface. Furthermore, in applications wherein the polymers are used in fabrics, the coatings are removed by laundering and dry cleaning of the fabrics.

It is an object of this invention to provide polymers having improved stability. It is another object to provide a process for coating organic polymeric surfaces with a stabilizer. Still another object of this invention is to provide improved bonding of stabilizer applied to the surface of an organic polymeric structure. It is another object to provide weather resistant organic polymeric compounds suitable for outdoor use and especially resistant to ultraviolet rays of the sun. Other objects will appear hereinafter as the description of the invention proceeds.

According to the invention, the resistance of a polymer structure to the effect of exposure to ultraviolet light is improved by contacting the surface of a polymer structure with a polyacid chloride and then treating it with a hydroxy substituted benzophenone compound having at least two free hydroxyl groups. The invention is conveniently carried out by dissolving a polyacid chloride such as terephthalyl chloride in an inert solvent, treating the polymer structure with the solution, drying the treated polymer and then treating it with a solution of a substituted benzophenone derivative such as 2,2′,4,4′-tetrahydroxybenzophenone dissolved in an inert solvent. The product is an organic polymeric structure chemically bonded to ultraviolet absorber by residues derived from the polyacid chloride. The treatment forms an ultraviolet light absorbent surface attached to the polymer base.

Organic polymeric structures that can be stabilized are structures containing reactive end groups such as polyesters and other polymers having active groups that react with chlorides. The polymers can be in the form of filaments, fibers, fabric, films, molded articles, shaped structures, or other forms. The reactive hydroxyl groups in polymers such as the polyesters are especially suited for the reaction with the polyacid chlorides. The chemical bond between the polymeric structure and the residue from the polyacid chloride provides a strong linkage to the polymeric structure. The ultraviolet light stabilizer reacts with the unreacted acid chloride group to form a chemical bond between the ultraviolet light stabilizer and the residue from the chloride. The product has improved resistance to ultraviolet light compared with that provided by the use of the ultraviolet stabilizer alone.

Representative examples of polyacid chlorides that can be used in the process of the present invention are terephthalyl chloride, isophthalyl chloride, trimesyl chloride, trimellityl chloride, pyromellityl chloride, acid chloride of 1,3-cyclopentane dicarboxylic acid, acid chloride of 4,4′-diphenyl dicarboxylic acid, acid chloride of 4,4′-diphenyl methane dicarboxylic acid, acid chloride of α,α′-dicarboxyl-p-xylene, and saturated dibasic acid chlorides from $C_2$ through $C_{12}$ such as acid chloride of oxalic, malonic, succinic, glutaric, adipic, represented by the formula

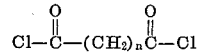

where $n$ is zero to 10. A polyacid chloride would be any organic molecule with at least two radicals of

The solvent used for the acid chloride should be inert; that is, it does not react with the polyacid chloride. Representative examples of inert solvents are chloroform, ethyl ether, propyl ether, butyl ether, etc.; ethane nitrile; ethylene dichloride; chlorobenzene; and nitromethane. The solvent used can have a low boiling temperature or a high boiling temperature.

The most useful stabilizers are the substituted benzophenone derivatives of the formula

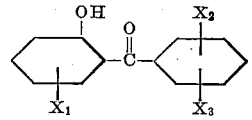

wherein $X_1$, $X_2$, and $X_3$ are selected from the group consisting of hydrogen, hydroxy, alkyl, alkoxy and halogen, and in which at least one of the X's is hydroxyl. The following are representative of the compounds that can be used.

2,2′-dihydroxybenzophenone
2,2′,4,4′-tetrahydroxybenzophenone
2,2′-dihydroxy-4,4′dimethoxybenzophenone
2,2′-dihydroxy-4,4′-diethoxybenzophenone
2,2′-dihydroxy-4,4′-dipropoxybenzophenone
2,2′-dihydroxy-4,4′-dibutoxybenzophenone
2,2′-dihydroxy-4-methoxy-4′-ethoxybenzophenone
2,2′-dihydroxy-4-methoxy-4′-propoxybenzophenone
2,2′-dihydroxy-4-methoxy-4′-butoxybenzophenone
2,2′-dihydroxy-4-ethoxy-4′-propoxybenzophenone
2,2′-dihydroxy-4-ethoxy-4′-butoxybenzophenone
2,3′-dihydroxy-4,4′-dimethoxybenzophenone
2,3′-dihydroxy-4-methoxy-4′-butoxybenzophenone
2,4-dihydroxybenzophenone
2,4-dihydroxy-4′-methoxybenzophenone
2,4-dihydroxy-4′-propoxybenzophenone
2,4-dihydroxy-4′-butoxybenzophenone 2,4-dihydroxy-2'-methoxybenzophenone
2,2',4-trihydroxybenzophenone
2,4,4'-trihydroxybenzophenone
2,2',4-trihydroxy-4'-methoxybenzophenone The reaction between the acid chloride and the organic polymeric structure occurs between the reactive groups of the polymer and the carbonyl chloride groups of the acid chloride. In linear polyesters the terminal hydroxyl (—OH) groups are the reactive groups involved in the reaction with the acid chloride, and the reaction produces ester linkages between the polyester chain ends and the acid chloride nucleus. In such polyesters the hydroxyl end groups are widely spaced apart and predominantly only one carbonyl chloride of the polyacid chloride is involved in reaction with the polyester, leaving the other carbonyl chloride free to react with the ultraviolet light stabilizer molecules, thus bonding them permanently to the polyester. Such chemically bonded stabilizer molecules cannot be leached off by detergents, dry cleaning solvents, or migration, and therefore, give more permanent ultraviolet light stabilization.

The products of this invention are organic polymeric structures having a coating derived from a substituted benzophenone compound having the formula

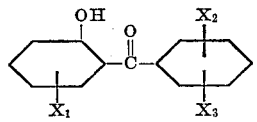

wherein $X_1$, $X_2$, and $X_3$ are each selected from the group consisting of hydrogen, hydroxyl, alkyl and halogen in which at least one of the X's is hydroxyl. The compound is chemically bonded to the surface of said polymeric structure by ester linkages. These ester linkages are formed by the reaction of the benzophenone compound and the acid chloride. The acid chloride is an acyl chloride of an acid selected from the group consisting of terephthalic acid, 1,3-cyclopentane dicarboxylic acid, 4,4'-diphenyl dicarboxylic acid, 4,4'-diphenyl methane dicarboxylic acid, α,α'-dicarboxyl-p-xylene and saturated acids of the aliphatic dicarboxylic series containing from two to twelve carbon atoms such as oxalic, malonic, succinic, glutaric and adipic. The aliphatic acid chlorides can be represented by the formula

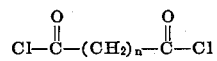

where $n$ is zero to ten.

The organic polymeric structure chemically bonded to the polyacid chloride residue and the chemical bond between the acid chloride residue and the ultraviolet light stabilizer results in improved ultraviolet light stability. It is this chemical bond that provides the organic polymeric structure with permanency in its improved ultraviolet light stability.

Applications in which the treated organic polymeric structure may be used include: laminations of such structure to other materials such as aluminum, fabrics, plywood, steel; production of various fabrics for outdoor use; molded goods for outdoor use; decorative objects; applications where polyethylene terephthalate would be desirable with improved ultraviolet light resistance and applications where an organic polymeric structure with improved ultraviolet light resistance would be desirable.

The base structure may contain pigments, dyes, delusterants, fillers, binders, plasticizers, etc.

The preferred ultraviolet light stabilizer includes 2,2'-dihydroxy-4,4'-dimethoxy benzophenone; 2,2',4,4'-tetrahydroxybenzophenone; 2,4-dihydroxybenzophenone; 2,2'-dihydroxybenzophenone; and 2,2' - dihydroxy-4,4'-diethoxybenzophenone.

The substituted benzophenone derivatives used as ultraviolet light absorbers are conveniently dissolved in a solvent to make possible their addition by way of a dipping operation. Solvents suitable for this operation are vaporizable solvents that will not react with the polyester or the acid chloride coating. Suitable solvents include methyl ethyl ketone; other ketones except acetone; benzene; toluene; xylene; chlorobenzene; dichlorobenzene and others.

The following examples illustrate the invention.

EXAMPLES I–III

Polyethylene terephthalate resin was prepared by reacting ethylene glycol and dimethyl terephthalate in the presence of a catalyst to form the ethylene glycol ester of terephthalic acid according to known procedure. A condensation catalyst was added and the glycol ester condensed under vacuum of about 0.1 mm. of mercury pressure at about 280° C. to form polymeric ethylene terephthalate. The polymeric ethylene terephthalate was melt extruded through a spinneret to form monofilaments.

The monofilaments were dipped in a 10% weight solution of a terephthalyl chloride dissolved in chloroform for 5 seconds. The monofilament was air dried for 2 minutes and then dipped in a saturated solution of 2,2',4,4'-tetrahydroxybenzophenone in methyl ethyl ketone for 5 seconds at room temperature, and heated for 2 minutes at temperature of 300° F. to evaporate the solvent and cause the unreacted acid chloride groups on the polyethylene terephthalate fibers to react with the benzophenone derivative.

The polyethylene terephthalate fibers thus coated were put into a standard weatherometer where they were subjected to exposure to ultraviolet light rays and intermittent water spray to simulate exposure to outdoor conditions in an accelerated manner.

The following data indicate the improvement in the stability of the fibers.

PERCENT BROKEN BONDS

| | 500 hours | 1,500 hours |
|---|---|---|
| I Filaments treated as above | 0.011 | 0.046 |
| II Filaments coated with stabilizer only | 0.022 | 0.053 |
| III Control (no stabilizer or acid chloride) | 0.07 | 0.14 |

The broken bonds measured are an indication of degradation in the polymer.

The percent broken bonds can be determined from the formula:

$$\frac{[(\text{initial intrinsic viscosity}) - (\text{final intrinsic viscosity})]K}{(\text{initial intrinsic viscosity})(\text{final intrinsic viscosity})}$$

=Percent Broken Bonds where K is a constant, approximately 0.4. Percent Broken Bonds represents the number of breaks in the polyester chain per each 100 ester links.

Intrinsic viscosity as recorded for the resins is defined as limit $$\frac{\ln(\eta_r)}{C}$$

as $C$ approaches 0 in which $\eta_r$ is the viscosity of a dilute solution of the resin in a 60/40 phenol/tetrachloroethane solvent mixture divided by the viscosity of the solvent mixture in the same units at the same temperature. For the intrinsic viscosities reported in this specification a sufficient sample of each resin was dissolved in the solvent mixture to form a solution having a resin concentration of approximately 0.4 gram per 100 cubic centimeters of solution. The time of flow of each solution and of the solvent was measured in a No. 1 Ubbelohde Viscosimeter at 30.0° C. and these times were used in the respective viscosities in the equation above.

In the above table the ethylene terephthalate monofilament used in sample II was dipped in a saturated solution of 2,2',4,4'-tetrahydroxybenzophenone in methyl ethyl ketone and dried in air at 300° F.

The procedure of Examples I–III was repeated with the filament being dried at about 400° F. The filament with stabilizer had superior resistance to ultraviolet light as shown by the data below.

PERCENT BROKEN BONDS

|  | 500 hours | 1,500 hours |
|---|---|---|
| I Predip and stabilizer dried at 410° F | 0.049 | 0.067 |
| II Stabilizer only dried at 410° F | 0.044 | 0.075 |

The polymers of this invention are high molecular weight polymers having at least an intrinsic viscosity of 0.3 and preferably 0.4 and higher. These high molecular weights are needed in the preparation of fibers and film forming polymers.

The invention has been illustrated particularly with respect to poly(ethylene terephthalate). It can be used with other polyesters or copolyesters. Representative examples of such polyesters are polyesters derived from dicarboxylic acids or ester forming derivatives thereof and glycols, for example, poly(tetramethylene terephthalate), poly(cyclohexylene dimethylene terephthalate), poly(ethylene bibenzoate), poly(ethylene-2,6-naphthalate), copolyesters such as ethylene terephthalate-ethylene isophthalate copolyesters, ethylene terephthalate-neopentyl terephthalate copolyesters, ethylene terephthalate-2,2 bis[4(beta hydroxy ethoxy phenyl) propane] terephthalate copolyesters, tetramethylene terephthalate-tetramethylene isophthalate copolyesters, ethylene terephthalate-ethylene-2,6 naphthalate copolyesters, ethylene terephthalate-ethylene adipate copolyesters and ethylene terephthalate-ethylene sebacate copolyesters.

The invention can be used with other organic polymeric structures having active groups that react with acid chlorides such as hydroxyl terminated polyethers and elastomers having free hydroxyl groups available for reaction with the acid chloride such as hydroxyl terminated polybutadiene and hydroxyl terminated butadiene-styrene copolymers.

While certain representative embodiments and details have been shown for the purpose of illustrating the invention, it will be apparent to those skilled in this art that various changes and modifications may be made therein without departing from the spirit or scope of the invention.

What is claimed is:

1. A process for modifying the surface of a shaped structure to impart resistance to degradation by ultraviolet light which comprises contacting a polymeric polyester shaped structure having reactive hydroxyl groups with (A) a polyacid chloride selected from the group consisting of acid chlorides of terephthalic acid, 1,3-cyclopentane dicarboxylic acid, 4,4'-diphenyl dicarboxyl acid, 4,4'-diphenylmethane carboxylic acid, $\alpha,\alpha'$-dicarboxyl-p-xylene and saturated acids of aliphatic dicarboxylic acid containing from two to twelve carbon atoms as represented by the formula

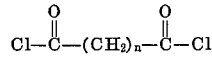

where n is 0 to 10 and then (B) a substituted benzophenonederivative having the formula

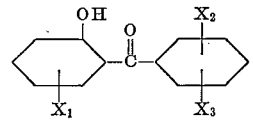

wherein $X_1$, $X_2$ and $X_3$ are each selected from the group consisting of hydrogen, hydroxy, and alkyl in which at least one of the X's is hydroxyl and thereafter the heating of the treated structure to a temperature ranging from about 200° F. to about 400° F.

2. The process as in claim 1 wherein the thermoplastic organic polymeric polyester shaped structure is selected from highly polymeric linear condensation polyesters and copolyesters derived from glycols and dicarboxylic acids or ester forming derivatives thereof.

3. The process as in claim 1 wherein the thermoplastic organic polymeric polyester shaped structure is selected from filament, film, fiber, laminate and molded product.

References Cited
UNITED STATES PATENTS

| 3,366,668 | 1/1968 | Strobel | 260—475 |
| 2,170,024 | 9/1939 | Heckert | 8—20 |
| 2,301,263 | 11/1942 | Dreyfus | 8—129 |
| 2,976,259 | 3/1961 | Hardy | 260—45.95 |
| 2,980,491 | 4/1961 | Segal | 8—120 |

GEORGE F. LESMES, Primary Examiner

B. BETTIS, Assistant Examiner

U.S. Cl. X.R.

8—116.4, 120; 260—47, 45.95